Sept. 29, 1970  H. W. ZELLEY ET AL  3,531,074
TILTING AND SUPPORTING APPARATUS FOR FOUNDRY VESSELS
Filed March 18, 1968  2 Sheets-Sheet 1
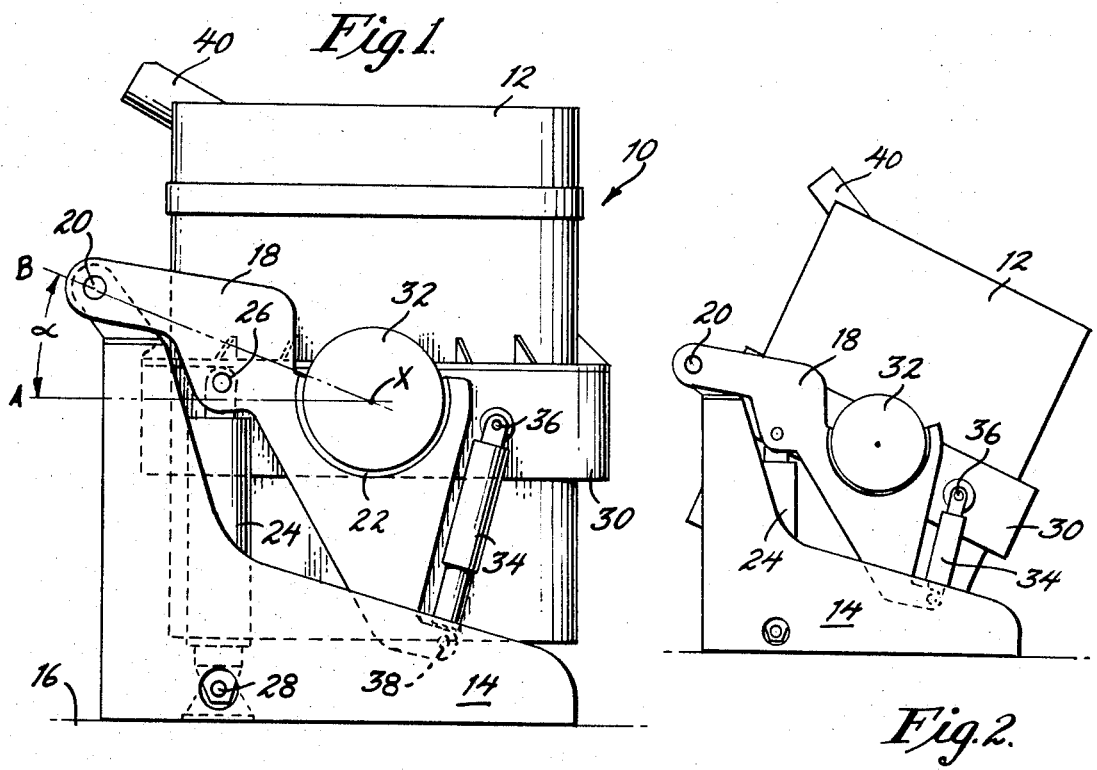
Fig.1.
Fig.2.
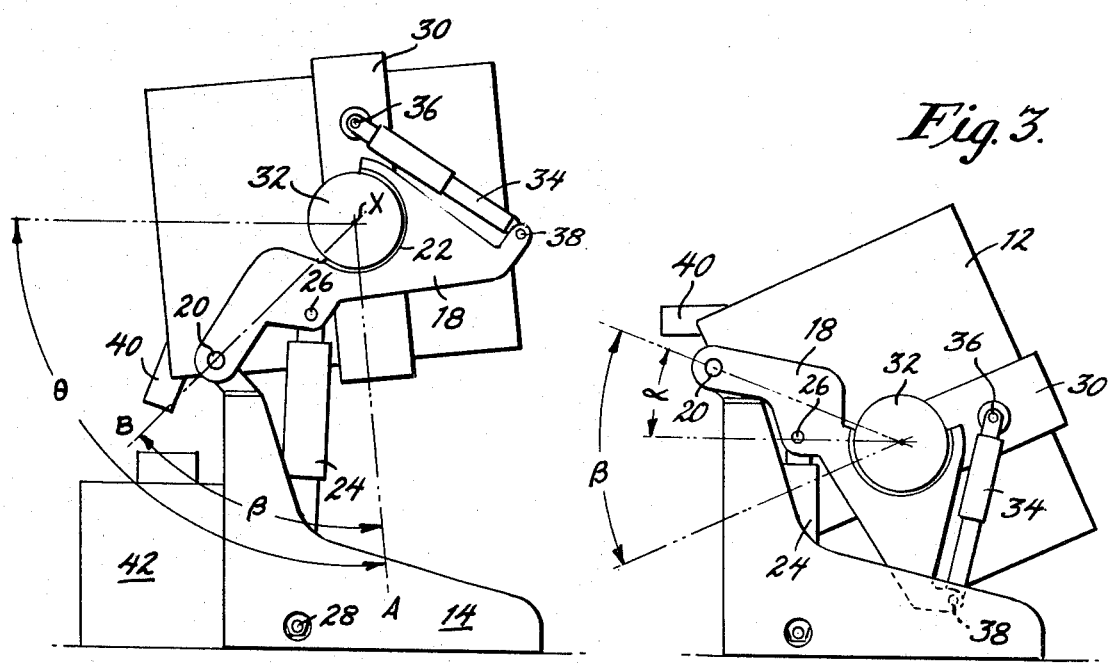
Fig.3.
Fig.4.
INVENTORS.
HERBERT W. ZELLEY
CLETUS R. VAN DINE
BY
ATTORNEYS.

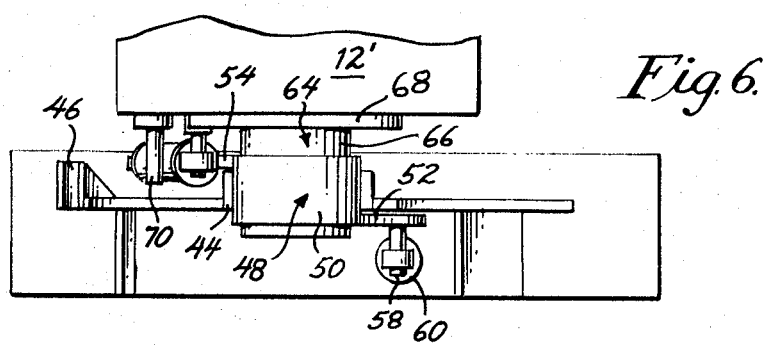
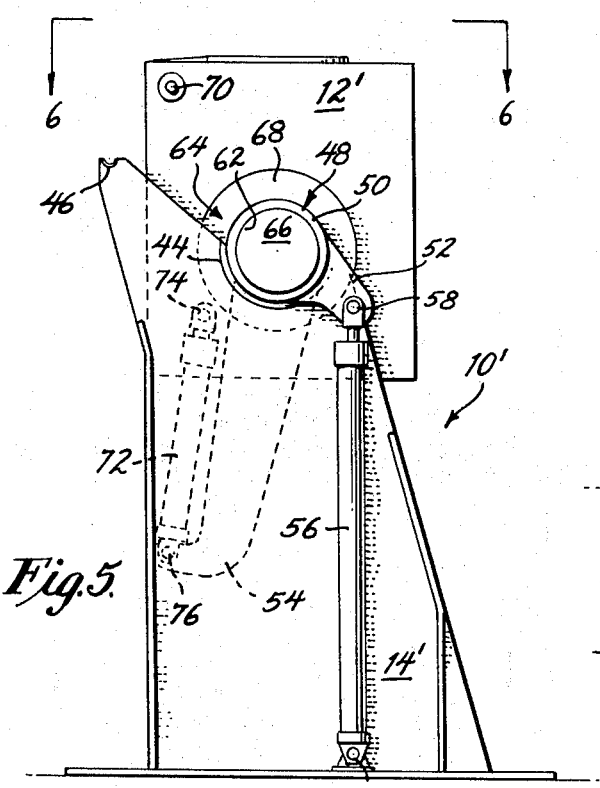
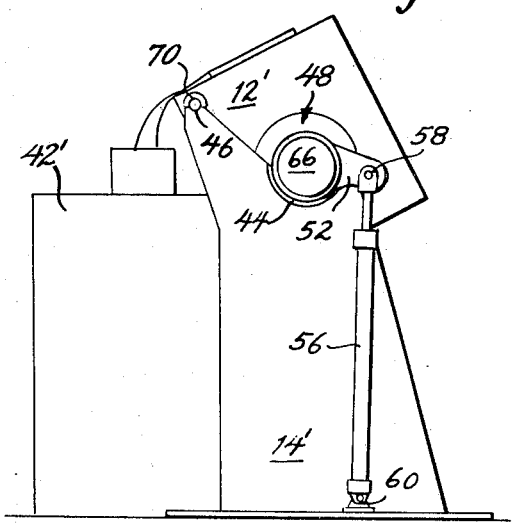
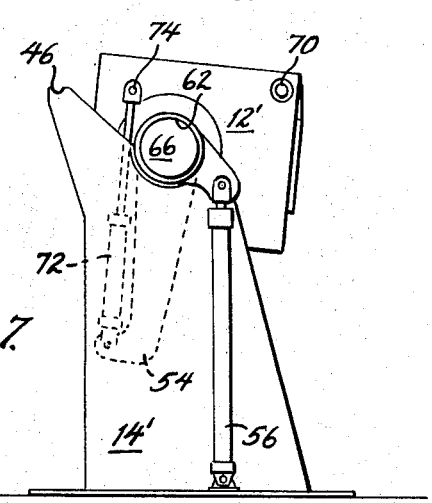
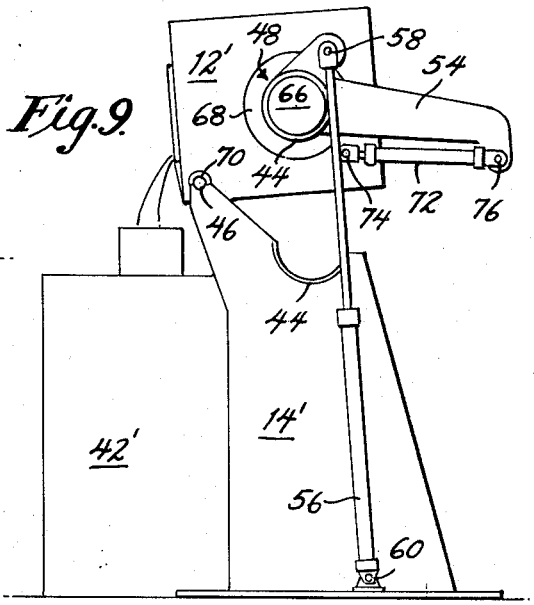
INVENTORS.
HERBERT W. ZELLEY
CLETUS R. VAN DINE
BY
ATTORNEYS.

United States Patent Office 3,531,074
Patented Sept. 29, 1970

3,531,074
TILTING AND SUPPORTING APPARATUS FOR
FOUNDRY VESSELS
Herbert W. Zelley, Burlington, and Cletus R. Van Dine,
Medford Lakes, N.J., assignors to Inductotherm Corporation, Rancocas, N.J., a corporation of New Jersey
Filed Mar. 18, 1968, Ser. No. 713,974
Int. Cl. A47f 5/12
U.S. Cl. 248—141                                     7 Claims

ABSTRACT OF THE DISCLOSURE

Tilting and supporting apparatus for foundry vessels or the like wherein a first movable support member is supported by a base, and a second movable support member is pivotably coupled to the first movable support member. Movement of the second movable support member in one direction augments the tilting movement relative to the base provided by the first movable support member. Tilting movement of the second movable support member in the opposite direction relative to the base provides for tilting of the vessel in such opposite direction.

---

This invention relates to tilting and supporting apparatus, and more particularly, tilting and supporting apparatus for foundry vessels or other similar heavy apparatus.

In foundry practice, it is often necessary to manipulate large vessels containing molten metals. Examples of such vessels are melting furnaces, converters and ladles. With most vessels, tilting is required during pouring, and may be necessary or desirable during charging and other operations. Numerous tilting apparatus has previously been proposed. For example, it has been suggested to employ gears and motors to rotate a vessel about its pivot axis. Arrangements using cables secured to the bottom of a pivotably mounted vessel are also known. Also, the use of hydraulic cylinders has been proposed. A shortcoming of many of the latter has been the need to disconnect the hydraulic cylinder from its point of anchorage on the vessel or the structure supporting the vessel, and re-connect it at a different point to obtain tilting in another direction. Another shortcoming of certain known hydraulically actuated tilting and supporting apparatus has been the need to perform manual steps in shifting a pivot point for the vessel or its support from one location to another.

The present apparatus is one wherein the foregoing shortcomings of prior art hydraulically actuated tilting and supporting apparatus are overcome. Specifically, the present apparatus is one wherein no manual shifting of pivot points, either for actuator apparatus or vessel support apparatus, is necessary. Thus, forward or rearward tilting is accomplished merely by operation of the proper actuators. No manual intervention, with its attendant difficulties and dangers, is required. Also definite limits are provided for tilting in either direction, thereby avoiding unintentional spillage.

In general terms, the present apparatus provides a member movable with respect to the base to provide a first motion component for the vessel. A second member, movable with respect to the first movable member, provides a second motion component. The total motion of the vessel is the sum of the first and second motion components. Thus, in operation the first component alone may be all the motion required. Where further motion is required, as for example during pouring of the last remnants of molten material from a vessel, the second motion component can be added to the first in the same direction to produce extreme tilt. If tilting in a reverse direction is desired, the first motion component is zero. In other words, the member providing such component is maintained stationary. The second motion component in such case provides the entire motion.

In view of the foregoing, it is an object of the present invention to provide an apparatus for tilting and supporting foundry vessels.

It is another object of the invention to provide an apparatus for tilting and supporting foundry vessels wherein a vessel may be tilted in more than one direction.

It is yet another object of this invention to provide tilting and supporting apparatus wherein tilting in any direction can be accomplished without changing the locations of pivot points for actuators or vessel support members, and is mechanically limited.

It is a still further object of this invention to provide a tilting and supporting apparatus for vessels wherein the overall motion of the vessel is the sum of a plurality of motions, the combination of such motions permitting precise control of the location of the pouring stream with respect to an opening in a receiving vessel such as a ladle or mold.

Other objects will appear hereinafter.

For the purpose of illustrating the invention, there are shown in the drawings forms which are presently preferred; it being understood, however, that this invention is not limited to the precise arrangements and instrumentalities shown.

FIG. 1 is a side elevation view showing one form of the invention with a vessel in a non-tilted position.

FIG. 2 is a side elevation view of the apparatus of FIG. 1 with the vessel in a "backward" tilted position.

FIG. 3 is a side elevation view of the apparatus of FIG. 1, with the vessel in an intermediate position.

FIG. 4 is a side elevation view of the apparatus of FIG. 1, with the vessel in a full tilt position.

FIG. 5 is a side elevation view of an alternate form of the apparatus.

FIG. 6 is a partial top plan view of the apparatus, taken along the line 6—6 in FIG. 5.

FIG. 7 is a side elevation view of the apparatus shown in FIG. 5, showing the vessel in a "backward" tilt position.

FIG. 8 is a side elevation view of the apparatus shown in FIG. 5, with the vessel in an intermediate pouring.

FIG. 9 is a side elevation view of the apparatus shown in FIG. 5, with the vessel in a full pouring position.

Referring now to the drawings in detail, wherein like numerals indicate like elements, there is seen in FIG. 1 a tilting and supporting apparatus designated generally by the reference numeral 10. The apparatus 10 is adapted to support, and tilt when desired, a foundry vessel 12.

The apparatus 10 includes a base 14. The base 14 is fixed, as to the floor 16. Movable support members, which may take the form of horizontally spaced arms 18, are pivotably supported by the base 14. Although only one arm 18 appears in FIG. 1, it should be understood that the side elevation view opposite the one shown in FIG. 1 is a mirror image of such figure. Hence, the arm 18 not shown is a mirror image of the one appearing in the figure. The arms 18 may be pivoted to the base 14 by pivot pins 20.

The arms 18 are provided at medial portions thereof with part-cylindrical bearing surfaces 22. Actuators 24, which preferably take the form of hydraulic cylinders, are coupled to the arms 18. The actuators 24 may be secured to the arms 18 by pivot pins 26. The other ends of the actuators 24 are secured to fixed structure, as for example, by pivot pins 28.

A movable support member in the form of a ring 30, adapted to receive the vessel 12, is pivoted to the arms 18. Extending outwardly from the ring 30 in opposite directions are trunnions 32. The trunnions 32 are complemental in outer contour with the bearing surfaces 22, and received therein. Thus, the bearing surfaces 22 and trunnions 32 provide for relative pivoting movement between the arms 18 and ring 30. The foundry vessel 12 moves, of course, with the ring 30. Actuators 34, secured to the arms 18 and ring 30 provide the necessary motion therebetween. The actuators 34 may be secured to the arms 18 and ring 30 by pivot pins 36, 38.

The mode of operation of the foregoing apparatus will now be described in detail.

Referring once again to FIG. 1, the axis defined by the center line of trunnions 32 is designated X. A plane A normal to the axis of the ring 30 and containing the axis X defines an angle $\alpha$ with a plane B passing through the axis of the pivot pin 20 and the axis X. When the vessel 12 is in its non-tilted position, as in FIG. 1, the angle $\alpha$ is also the angle described by the plane B and a horizontal plane. In FIG. 4, the vessel 12 is shown in its full tilt position. The actuators 24 have been extended to rotate the arms 18 about the pivot pins 20. The actuators 34 have been extended to rotate the ring 30 with respect to the arms 18. A spout 40 on the foundry vessel 12 is disposed above the mold, shown diagrammatically, and indicated by the reference numeral 42. The planes A and B define therebetween an angle $\beta$. The difference between the angles $\beta$ and $\alpha$ represents the degree of rotation between the arms 18 and ring 30, generated by movement of the actuators 34. The angle $\theta$ swept by the plane A represents the total angular rotation of the vessel 12. In a working example, the angle $\theta$ was 95°. The angle $\beta$ minus $\alpha$ was 25°. The remaining 70°, was supplied by rotation of the arms 18 upon operation of the actuators 24. It is readily apparent that no actuator in the present apparatus need provide the stroke necessary for full rotation. Thus, the actuators 24 and 34 can each be relatively short stroke actuators. Their combined effect, however, is rotation of the vessel 12 obtainable only with expensive and difficult-to-manufacture long-stroke actuators in prior art apparatus.

Referring now to FIG. 2, the foundry vessel 12 is shown in a backward tilt position. Such position is achieved by retraction of the actuators 34. Such retraction results in rotation of the ring 30 in a clockwise direction with respect to the arms 18.

Referring to FIG. 3, the foundry vessel 12 is shown in a position wherein only the actuators 34 are extended. Extension of the actuators 34 produces rotation of the ring 30 and vessel 12 through the aforementioned angle $\beta$ minus $\alpha$. With some charges, such rotation is sufficient to initiate pouring. Also, rotation between the positions shown in FIGS. 2 and 3 by cyclic extension and retraction of the actuators 34 provides agitation of the charge to insure complete melting of the charge. Such cyclic movement is of course limited by the degree of retraction and extension of the actuator 34, and is therefore self-limited to prevent spilling.

Referring now to FIGS. 5 to 9, there is seen an alternative form of a tilting and supporting apparatus in accordance with the principles of the present invention, designated generally by the reference numeral 10'. Elements corresponding to those heretofore described are designated by like primed numerals.

The base 14' of the apparatus 10' includes upwardly facing pivot bearing surfaces 44. Also, the base 14' includes additional bearing surfaces 46 providing a pivot point spaced from the pivot bearing surfaces 44. A support member designated generally by the reference numeral 48 is normally received in the pivot bearing surface 44. The support member 48 includes a portion 50 complemental in cross-section with the pivot bearing surface 44. Also, the support member 48 includes arms 52, 54. In the illustrated embodiment, the arms 52, 54 are axially and radially spaced. An actuator 56, preferably in the form of a hydraulic cylinder, is coupled to the arm 52 and to fixed structure such as a portion of the base 14'. The actuator 56 may be coupled to the arm 52 and base 14' by pivot pins 58 and 60.

An interior surface 62 of the portion 50 provides a further bearing surface, coaxial with the bearing-engaging surfaces of the portion 50. In the illustrated embodiment, the further bearing surface defined by the interior of surface 62 is also coaxial with the pivot bearing surface 44. A member, designated generally by the numeral 64, includes a trunnion 66 complemental with the interior surface 62. Also, the movable member 64 includes a flange portion 68. The flange portion 68 is adapted, by means not shown, for securement to a vessel 12'. A pin 70, the purpose of which will be explained later, is secured to the vessel 12' at a position spaced from the trunion 66.

An actuator 72 is secured at one end to the arm 54 and coupled at the other to the movable member 64. Thus, in the illustrated embodiment, the other end of the actuator 72 is pivoted to the foundry vessel 12' by a pivot pin 74. The vessel 12' is of course rigid with the movable member 64. A pivot pin 76 is provided between the actuator 72 and arm 54.

The foregoing description has been made in reference to the structure seen in FIGS. 5 to 9. It should be understood that the side elevation view opposite the one shown in FIG. 5 is a mirror image of such figure.

Operation of the above-described modified form of the invention should now be apparent.

Referring to FIG. 7, the vessel 12' is seen in a backward tilt position. Such position is obtained by extension of the actuator 72. Such extension results in pivoting of the trunion 66 with respect to the bearing surface provided by the interior surface 62. The position shown in FIG. 7 provides easy access to the pouring opening, not numbered, in the top of the foundry vessel 12'.

Referring now to FIG. 8, the vessel 12' is shown in an initial tilt position. Tilting is caused by extension of the actuator 56. Extension of the actuator 56 results in rotation of the support member 48 with respect to the pivot bearing surface 44. Rotation of the vessel 12' to the position shown in FIG. 8 is sufficient to initiate pouring, and in some cases may be all the tilting required. Molten material from the vessel 12' in FIG. 8 enters a mold 42'.

It will be noted in FIG. 8 that rotation of the support member 48 with respect to the pivot bearing surface 44 through a predetermined arc brings the pin 70 into contact with the additional bearing surface 46. As seen in FIG. 9, the pivot bearing surface 44 is part-cylindrical in cross-section. Thus, it is possible to lift the support member 48 from the pivot bearing surface 44. Lifting of the support member 48 from the pivot bearing surface 44 is accomplished by extension of the actuator 46 beyond its position in FIG. 8. In FIG. 9, the vessel 12' has rotated about the pin 70 to a position approaching its full tilt position.

Tilting and supporting apparatus in accordance with the present invention are particularly suited to use with electric furnaces. The trunnions 32, 66 provide a convenient point of entry for flexible power leads, not shown. The trunnions move through an arc of only about 70° at full tilt. Thus, the need for slack in the power leads to accommodate tilting is minimized. Also, the trunnions 32, 66 rotate only about 25° in either direction with respect to the bearing surfaces 22, 44. Twisting of the leads is thus limited. An added advantage of the present apparatus is that the tilting clearance envelope for a given vessel is reduced. Where a vessel is intended for vacuum use, a smaller chamber and smaller vacuum pumping apparatus may be used.

The present invention may be embodied in other specific forms without departing from the spirit or essential attributes thereof and, accordingly, reference should be made to the appended claims, rather than to the foregoing specification as indicating the scope of the invention.

We claim:
1. Tilting and supporting apparatus for foundry vessels, comprising a base, a first movable support member pivotally supported by said base, a second movable support member pivotally coupled to said first movable support member and adapted to support a vessel, a first actuator coupled to said first movable support member and said second movable support member for causing relative rotation therebetween so that a supported vessel can be tilted to a pouring position, and a second actuator interconnecting said first movable support member and said base for causing relative rotation therebetween so that a supported vessel can be tilted to another pouring position.

2. Apparatus in accordance with claim 1 wherein said first movable support member comprises horizontally spaced arms having corresponding portions thereof pivoted to said base, bearing portions on said arms spaced from said portions pivoted to said base, said second movable support member comprising trunnions engaging said bearing portions, said second actuator means comprises extendable cylinders having the ends thereof coupled to said arms and said base, and said first actuator means comprises extendable cylinders having the respective ends thereof coupled to said arms and said trunnions.

3. Apparatus in accordance with claim 2 wherein said second movable support member comprises a ring adapted to receive a vessel therein, said trunnions being disposed on opposite sides of said ring, and said second actuator means being pivotably secured to said ring.

4. Apparatus in accordance with claim 1 wherein said base includes a bearing surface, said first movable support member including portions complemental with said bearing surface for rotation therein, said first movable support member including a further bearing surface, said second movable member including a trunnion portion complemental with said further bearing surface for rotation therein, said second actuator means comprises an extendable cylinder having respective ends thereof coupled to said first movable support member and said base, and said first actuator means comprises an extendable cylinder having respective ends thereof coupled to said first movable support member and said trunnion portion.

5. Apparatus in accordance with claim 4 wherein said further bearing surface is coaxial with said bearing surface of said base.

6. Apparatus in accordance with claim 4, and a vessel fixedly secured to said second movable support member, said first actuator means being pivotably secured to said vessel at a point spaced from said trunnion portion.

7. Apparatus in accordance with claim 6 wherein said bearing surface on said base is part cylindrical in cross-section, a pivot point on said base spaced from said bearing surface thereon, and means on said vessel adapted to be received in said pivot point upon actuation of said first actuator by a predetermined amount.

References Cited
UNITED STATES PATENTS

| | | | |
|---|---|---|---|
| 1,753,756 | 4/1930 | Small | 248—137 |
| 2,472,251 | 6/1949 | Houghton | 248—140 |
| 3,310,298 | 3/1967 | Howyler et al. | 248—141 |
| 3,311,361 | 3/1967 | Zepernick. | |

MARION PARSONS, Jr., Primary Examiner

U.S. Cl. X.R.

266—36